(12) United States Patent
Memon et al.

(10) Patent No.: US 9,984,168 B2
(45) Date of Patent: May 29, 2018

(54) GEO-METRIC

(71) Applicant: Facebook, Inc., Menlo Park, CA (US)

(72) Inventors: Amir Hussain Memon, Fremont, CA (US); Scott J. Bratsman, Fremont, CA (US); Steven Young, Mountain View, CA (US); Joshua Chaim Roberts, San Francisco, CA (US); Aapo Kyrölä, London (GB); Timothy A. Stanke, Los Gatos, CA (US)

(73) Assignee: Facebook, Inc., Menlo Park, CA (US)

( * ) Notice: Subject to any disclaimer, the term of this patent is extended or adjusted under 35 U.S.C. 154(b) by 235 days.

(21) Appl. No.: 14/740,034

(22) Filed: Jun. 15, 2015

(65) Prior Publication Data

US 2016/0364409 A1    Dec. 15, 2016

(51) Int. Cl.
    *G06F 17/30*    (2006.01)
    *H04W 4/02*    (2018.01)

(52) U.S. Cl.
    CPC ........ *G06F 17/3087* (2013.01); *H04W 4/021* (2013.01)

(58) Field of Classification Search
    None
    See application file for complete search history.

(56) References Cited

U.S. PATENT DOCUMENTS

| | | | | |
|---|---|---|---|---|
| 8,180,804 B1 * | 5/2012 | Narayanan | ........ | G06F 17/30867 707/798 |
| 8,185,558 B1 * | 5/2012 | Narayanan | ........ | G06F 17/30958 707/798 |
| 8,442,265 B1 * | 5/2013 | Bosworth | ........... | G06F 17/3079 382/100 |
| 9,720,964 B1 * | 8/2017 | Hansen | ............. | G06F 17/30442 |
| 2011/0010364 A1 | 1/2011 | Ahtisaari | | |
| 2012/0047129 A1 * | 2/2012 | Redstone | ............ | G06F 17/3087 707/723 |
| 2012/0083286 A1 | 4/2012 | Kim | | |

(Continued)

FOREIGN PATENT DOCUMENTS

KR    10-2014-0146251 A    12/2014

OTHER PUBLICATIONS

Communication, European Search Report; Annex to the European Search Report, European Patent Office, Patent Application No. EP 16 15 0772, dated Oct. 11, 2016.

(Continued)

*Primary Examiner* — Hung Le
(74) *Attorney, Agent, or Firm* — Baker Botts L.L.P.

(57) ABSTRACT

In one embodiment, a method includes identifying a first node and a second node in a social graph. The historical location data is available for the first node and for the second node. The method also includes accessing one or more component metrics for computing a geo-metric. The geo-metric represents an assessment of a spatial commonality between the first node and the second node. The spatial commonalities are determined based on historical location data stored for the first node and historical location data stored for the second node. The method also includes accessing one or more coefficients each corresponding to one of the component metrics; calculating the geo-metric by applying the received coefficients to the component metrics and combining the component metrics; and providing the calculated geo-metric.

54 Claims, 4 Drawing Sheets

(56) References Cited

U.S. PATENT DOCUMENTS

| | | | |
|---|---|---|---|
| 2012/0303459 A1 | 11/2012 | Stephens | |
| 2013/0086169 A1* | 4/2013 | Bruich | H04L 65/40 |
| | | | 709/204 |
| 2013/0124538 A1* | 5/2013 | Lee | G06F 17/3053 |
| | | | 707/749 |
| 2013/0191372 A1* | 7/2013 | Lee | G06F 17/30958 |
| | | | 707/722 |
| 2013/0191416 A1* | 7/2013 | Lee | G06F 17/30979 |
| | | | 707/771 |
| 2013/0268591 A1* | 10/2013 | Chen | G06Q 50/01 |
| | | | 709/204 |
| 2013/0346233 A1 | 12/2013 | Caralis | |
| 2014/0040285 A1* | 2/2014 | Rubinstein | G06F 17/3053 |
| | | | 707/751 |
| 2014/0067937 A1 | 3/2014 | Bosworth | |
| 2014/0089816 A1* | 3/2014 | DiPersia | G06F 3/0484 |
| | | | 715/753 |
| 2014/0196116 A1 | 7/2014 | Maguire | |
| 2014/0317184 A1* | 10/2014 | Weaver | H04L 67/22 |
| | | | 709/204 |
| 2015/0012596 A1 | 1/2015 | Redstone | |
| 2015/0046841 A1* | 2/2015 | Sharon | G06Q 50/01 |
| | | | 715/753 |

OTHER PUBLICATIONS

International Search Report and Written Opinion for International Application PCT/US2015/066320, dated Apr. 4, 2016.

* cited by examiner

GEO-METRIC

TECHNICAL FIELD

This disclosure generally relates to location-based metrics.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send content or messages related to its services over one or more networks to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area network (WLAN) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a metric ("geo-metric") that is indicative of how frequently people interact with other users or entities in the physical world rather than the virtual one may be calculated. For example, more times a user physically interacts with particular friends or businesses (e.g., a restaurant, park, venue, or landmark), the higher value of the metric. In particular embodiments, the metric may be based on signals that are obtained from outside of a social network (e.g., geo-location, sensor, or BLUETOOTH low energy (BLE) beacon data). For example, geo-location data may be obtained using ambient location data collection. As another example, sensor data may include ambient audio data collected through the microphone of a device. As another example, a particular store may use BLE beacons to determine your location with a higher level of precision than from location data alone.

In particular embodiments, the geo-metric may be implemented as a weighted function with component metrics that are modified by coefficients. The component metrics may include a quickly-decaying component metric (e.g., based on recent proximity), a slower-decaying component metric (e.g., longer-term overlap), and component metric for geo-location overlaps without a temporal element, for example people who share at least one major hotspot, but may not be near each other at the same time (e.g., have the same workplace or attend the same school). The coefficients applied to each component metric may be determined through machine learning algorithms.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims, but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
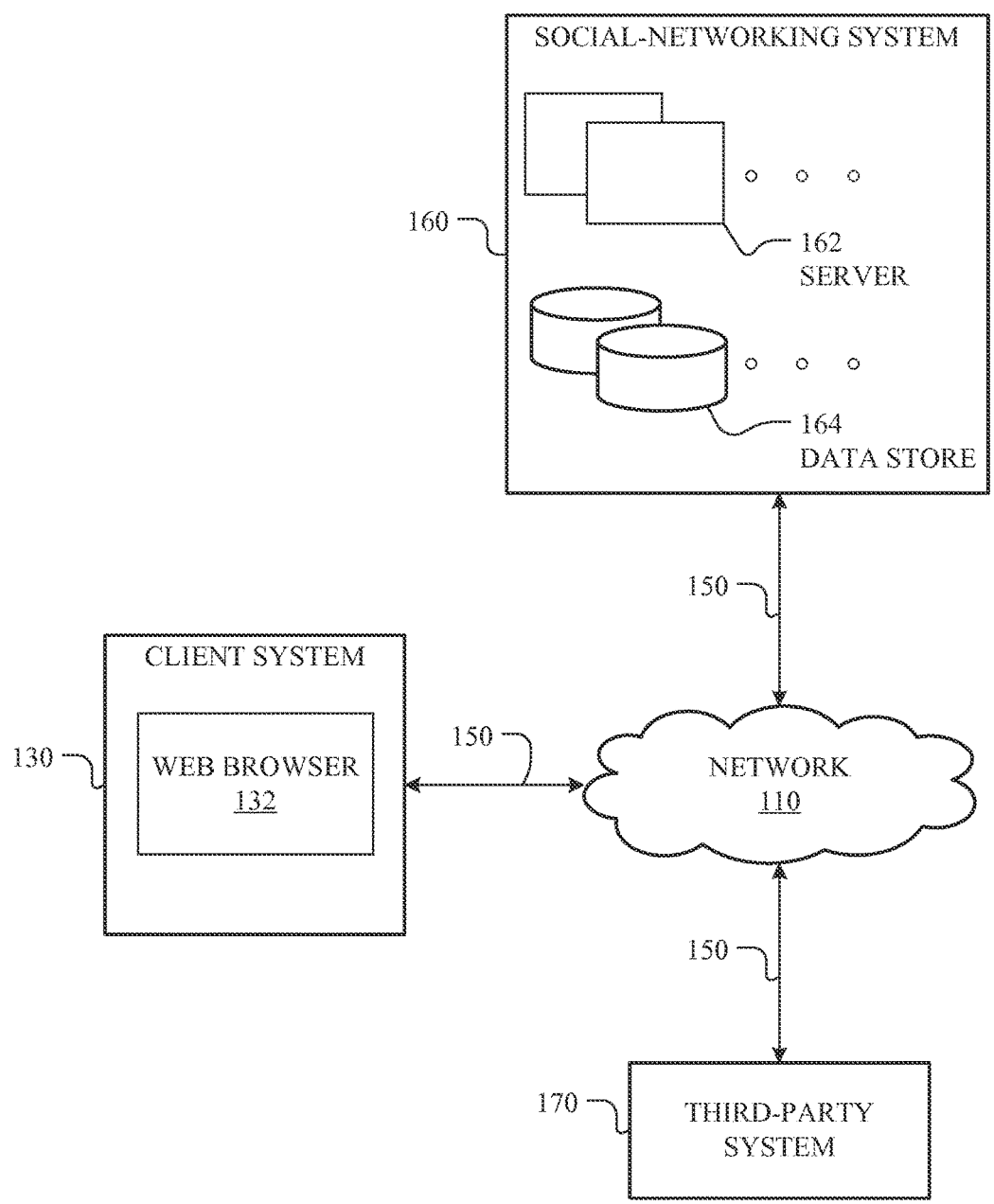
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, global-positioning system (GPS) device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate with client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking 160 or third-party 170 system may poll or "ping" client system 130 using an activation signal to obtain location information. As an example and not by way of limitation, the social-networking system may poll an application executed by mobile device 130 for location data by sending the activation signal activate a location service of client system 130. The activation signal may be transmitted using a wireless communication protocol, such as for example WI-FI or Long-Term Evolution (LTE). In particular embodiments, the location service of client system 130 may use one or more methods of location determination, such as for example using the location of one or more cellular towers, crowd-sourced location information associated with a WI-FI hotspot, or the global-positioning system (GPS) function of client system 130.

In particular embodiments, an audio capture application executed on client system 130 may continuously or at periodic intervals capture audio data from a microphone of client system 130 and converts it into an audio fingerprint. As an example and not by way of limitation, the waveform fingerprint may be generated using audio feature detection algorithms (e.g., fast-Fourier transform (FFT) or discrete cosine transform (DCT)). The audio fingerprint is a small, robust representation that summarizes the waveform or collection of waveforms.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162.

In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social networking system may store geographic and location data in one or more data stores 164. Social-networking system 160 may poll or "ping" client system 130 using an activation signal to obtain location information of client system 130. In particular embodiments, social networking system 160 may store audio waveforms or audio waveform fingerprints for various songs, television shows, soundtracks, movies, performances, and the like in one or more data stores 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interface (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as for example coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

In particular embodiments, the location service of client system 130 may use one or more methods of location determination, such as for example, using the location of one or more cellular towers, crowd-sourced location information associated with a WI-FI hotspot, or the GPS function of client system 130. In particular embodiments, the application of client system 130 may transmit location data and other relevant data, such as for example, the signal strength from nearby cellular towers. As an example and not by way of limitation, GPS data may be used the primary source of location information depending at least in part on whether client system 130 is able to acquire GPS data. If client system 130 is unable to acquire the GPS data within a pre-determined duration, the location of client system 130 may be determined using one or more cellular towers or WI-FI hotspots. Although this disclosure describes a location service using particular methods of location determination, this disclosure contemplates a location service using any suitable method or combination of methods of location detection.

In particular embodiments, social-networking system 160 may group multiple location readings from client system 130 to determine geographic clusters that are representative of the location readings. As an example and not by way of limitation, multiple geo-location data points may grouped using a spatial-clustering algorithm. In particular embodiments, the spatial-clustering algorithm may represent multiple geo-location data points as one or more geographic clusters or "hotspots." Furthermore, social-networking 160 or third-party 170 system may determine geographic cluster corresponds to a particular geolocation. As an example and not by way of limitation, social-networking system 160 may access a database of directory information and associate one or more of the geographic cluster to a particular residence, venue, or place of business.

In particular embodiments, information of the user may be inferred based at least in part on the user's geographic clusters. As an example and not by way of limitation, social-networking system 160 may infer a home location of the user based at least in part on an assumption that most people are at the home location during between 2-5:00 AM every weekday and the geographic cluster of the user at those times. As another example, social-networking system 160 may infer the place of employment of the user based at least in part on an assumption that most people are at the work place during between 2-5:00 PM every weekday and that work place coincides with the geographic cluster of the user at those times.

GPS-based location services may be most useful to determine the location of the client system 130 in open spaces, but is difficult to determine a location within a building, such as for example a mall or movie theater. In particular embodiments, the location of client system 130 may be determined through the use of BLUETOOTH LOW ENERGY (BLE) beacons. BLE beacons are part of an indoor positioning system that extends the location services of client system 130. As an example and not by way of limitation, the location services of client system 130 may determine client system 130 is within proximity to a particular building, but the location of client system 130 may be refined using BLE beacons located within a store to determine if client system 130 is inside or outside the building.

BLE beacons are configured set to send a "proximity signal" at pre-determined time intervals. BLE beacons send a universally unique identifier (UUID) and a major and minor code. The UUID is used to identify a common group of beacons (e.g., associated with a particular store) and the major and minor codes may be used to uniquely associate a beacon with a given location or area of a physical space, so that any suitably equipped device nearby (such as a mobile device) can detect it. An application executed on client system 130 may process the proximity signal from the BLE beacon and social-networking system 130 may determine client system 130 is inside a building based on the information encoded in the proximity signal.

The location of client system 130 may be refined based on audio signals captured by a microphone of client system 130. In particular embodiments, social-networking system 160 may match audio waveforms uploaded by client system 130 to waveform fingerprints stored in one or more data stores 164 described above. Waveform matching may utilize feature detection algorithms, such as for example Fast Fourier Transforms (FFTs) or Direct Cosine Transforms (DCTs). Furthermore, cross correlation in either the frequency or time domain may be utilized for waveform matching. As an example and not by way of limitation, client system 130 may send location data indicating client system 130 is in the vicinity of a park. The microphone of client system 130 may capture and upload an audio waveform of a song being performed by a band playing at the park. Client system 130 or, alternatively, social-networking system 160, may access a data store 164 that may include a list of performances near the park. If a match is found between the uploaded audio waveform and one of the waveform fingerprints stored in data store 164, social-networking system 160 may infer that client system 130 is at the park and listening to a live performance.

In particular embodiments, social-networking system 160 may calculate a metric of interaction (which may be referred to herein as "geo-metric") of various social-graph entities that takes place outside of social-networking system 160. The geo-metric may represent an assessment of future interaction based on previous spatial commonalities between particular nodes associated with the online social network, such as users, entities, geo-locations, or other objects associated with the online social network, or any suitable combination thereof. As an example and not by way of limitation, the spatial commonality may reflect physical or "real-world" interaction between nodes of a social graph. In particular embodiments, the geo-metric may also represent a probability or function that measures a predicted probability that a user may perform a particular action in relation to another user or entity based on the user's previous spatial commonalities with other users or entities. In this way, a user's future actions may be predicted based on the user's prior actions, where the geo-metric may be calculated at least in part on the user's stored location data. The geo-metric may be used to predict any number of actions, which may occur within or outside of the online social network.

The geo-metric may also be determined with respect to objects associated with third-party systems 170 or other suitable systems. As an example and not by way of limitation, the more often a user shares a spatial commonality with particular friends or businesses (e.g., a restaurant, park, venue, or landmark), the higher value of the geo-metric. The geo-metric may change based on continued monitoring of the location data or relationships associated with the social-graph entity. Although this disclosure describes determining a particular geo-metric in a particular manner, this disclosure contemplates determining any suitable location-based metric in any suitable manner.

To predict the likely actions a user may take in a given situation, any process on social networking system 160 or third-party system 170 may request the geo-metric for a user or entity by providing a set of coefficients or weights. As an example and not by way of limitation, the value of the geo-metric may be computed on-demand at the time of the request. In particular embodiments, the component metrics of the geo-metric may be calculated based on the historical location data and other sensor data of the entities. Example component metrics related to spatial commonality or interaction may include, for example, a number of times two or more users are at a same event within a particular time frame, a number of times a user frequents a particular place of business or venues, a number of times an entity interacts with other users, or any other location-based activity involving an action or object of social networking system 160 related to other users or entities. In particular embodiments, the geo-metric may measure user-related interactions. As an example and not by way of limitation, the geo-metric may measure a person to person interaction, such as for example users connected in a social-graph that have a spatial commonality with each other. Social-networking system 160 may determine the number of times two users met or spent time together based on being within a pre-determined distance of each other at the same time. In particular embodiments, this determination may be based on ambient location data polled from client system 130 of each user. In particular embodiments, the determination may be based on two users that have checked-in at the same geo-location, such as for example a restaurant.

As another example, the geo-metric may measure a person to entity interaction, such as for example, a user and an entity that are connected in a social-graph and having a spatial commonality with each other. For example, social-networking system 160 may determine the number of times a user frequented a geo-location associated with an entity (e.g., a restaurant). As another example, social-networking system 160 may determine the number of times connected users are at the same geo-location as another entity (e.g., users attending a concert at a venue where a particular music group is performing at that time). In particular embodiments, this determination may be based on client system 130 of a user receiving data from a BLE beacon placed in a restaurant. In particular embodiments, the determination may be based on client system 130 of connected users capturing audio waveforms of the same song and having a similar volume.

As another example, the geo-metric may measure a person to a type/category of entity that is a broader measure of interaction than a person to entity interaction. In particular embodiments, social-networking system 160 may determine the number of times a user frequented one or more geo-locations associated with a type or category of entity. As an example and not by way of limitation, this determination may be based on a number of times location data received from client system 130 of a user indicates the user is within the boundaries of one or more state parks. As another example, this determination may be based on a number of times a user has accepted evening events at movie theaters that are organized through social-networking system 160.

In particular embodiments, the geo-metric may measure entity-related interactions. As an example and not by way of limitation, the geo-metric may measure an entity to person interaction, such as for example, a particular food truck or establishment and the users who visit it. As another example, the geo-metric may measure an entity to location interaction, such as for example, tracking the location of a food truck at various times using location data of the food truck. As another example, the number of times a music group plays at a particular venue the geo-metric may measure an entity to entity interaction, such as for example, tracking the number of times a music group plays at a particular venue based on status updates posted on social-networking system 160.

In particular embodiments, the geo-metric may be implemented as a weighted linear function with component metrics that are each modified with a weighting coefficient. As an example and not by way of limitation, the geo-metric may be represented by equation (1), $$\text{geo-metric} = a_0 + a_1 x_1 + a_2 x_2 + a_3 x_3 \quad (1)$$

where $a_0$ is a base value, $a_1 \ldots a_3$ are coefficients of each component metric, and $x_1 \ldots x_3$ are component metrics described above. Furthermore, each component metric (e.g., $x_1$) may include multiple location-based components and each location-based component may have its own weighting coefficients. For example, a recency-based metric, described below, may include a combination of location-based components such as for example, determining whether two users are currently within a pre-determined distance from each other, determining whether the two users have recently checked-in at the same location, or a restaurant that trending. In particular embodiments, one or more of the coefficients may be based on an affinity, described below, between two nodes, such that the stronger the relationship between the nodes, the higher value of the coefficient. As an example and not by way of limitation, component metrics related to users with a high affinity to each other (e.g., friends, co-workers, or classmates) may have an associated coefficient with a relatively high value. In particular embodiments, one or more component metrics may be added to or removed from the geo-metric to improve accuracy or to account for additional location-based component metrics. In particular embodiments, the value of the geo-metric may be in a range between 0 and 1.

One or more of the component metrics may use a decay factor in which the strength of the signal from a user's historical location data decays as a function of time. Furthermore, different component metrics may decay the historical location data at different rates. Therefore, some component metrics may decay the effect of historical location data based on an understanding about how that particular location data may become less relevant with the passage of time. Various decay mechanisms may be used for this purpose. As an example and not by way of limitation, a particular component metric may use a mathematical function, such as an exponential decay, to decay the statistics about a user behavior. As another example, the decay is implemented by selecting only those statistics about a user behavior that occurred within a specific window of time, such as for example 24 hours or 30 days.

In particular embodiments, the component metrics may include a recency-based metric (e.g., based on recent proximity), time-duration metric (e.g., longer-term overlap), or metric related to location overlap between nodes without any temporal element (time-independent). As an example and not by way of limitation, the recency-based component metric may be indicative of a probability that two users are within a pre-determined distance from each other at the same time. As another example, the time-duration metric may be indicative of a probability of a user interacting with a particular entity, such as for example a restaurant or movie theater, or probability of a particular food truck will be at a particular geo-location. As another example, the time-independent component metric may be an indication of whether users share at least one major geographic cluster, but are not necessarily in proximity to each other at the same time (e.g., users who share the same workplace or attend the same school).

In particular embodiments, the values of the weighting coefficients may be determined using a machine learning algorithm that is trained based on location data and other sensor data that is historical, captured in real-time, or any combination thereof. The weighting coefficients may be binary or, more generally, any real number. In particular embodiments, the weighting coefficients may be an indication of the relative importance of each component metric to the overall geo-metric—a higher valued weighting coefficient may imply the particular component metric has a higher impact on the overall geo-metric. The weighting coefficients may be continuously updated based on continued tracking of the location data upon which the component metric is based. In particular embodiments, social-networking system 160 may determine the weighting coefficients using machine-learning algorithms trained on historical location data. In particular embodiments, each component metric's value may be kept up to date as updates in the location-based data occur, e.g., updated location data is received, audio waveforms uploaded, or people update their location or add a friend. Although this disclosure describes calculating weighting coefficients or component metrics in a particular manner, this disclosure contemplates calculating weighting coefficients or component metrics in any suitable manner.

Various processes of social-networking system 160 or third-party system 170 may request the geo-metric from social-networking system 160. For example, the processes may include those that implement basic social networking system functionality, such as recommendation algorithms, notification algorithms, and ad-targeting algorithms, among many others. Other processes that request the geo-metric may be executed by one or more platform applications, which are applications that operate within social networking system 160 but may be provided by third parties other than an operator of social-networking system 160. Platform applications may include social games, messaging services, and any other application that uses the social platform provided by social-networking system 160. In some embodiments, the processes requesting the geo-metric may include one or more external applications running on an external server. The external applications may interact with the social networking system via an API. The external applications can perform various operations supported by the API, such as enabling users to send each other messages through social-networking system 160 or showing advertisements routed through social networking system 160.

Figure 2:
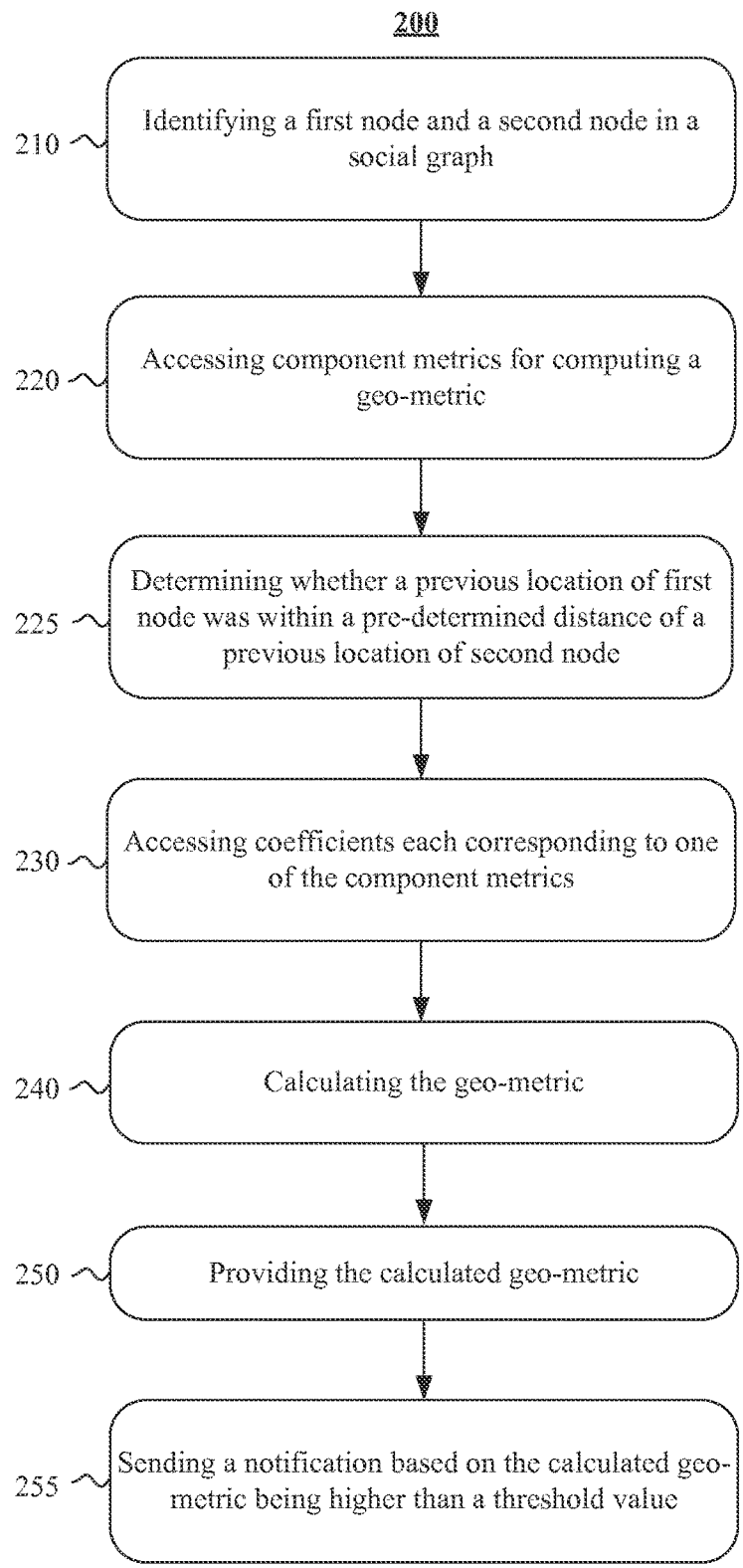
FIG. 2 illustrates an example method for computing a geo-metric between particular nodes of a social graph.

FIG. 2 illustrates an example method for computing a geo-metric between particular nodes of a social graph. The method 200 may start at step 210, where a first node and a second node are identified in a social graph. In particular embodiments, historical location data for the first node and for the second node is available. As an example and not by way of limitation, the first node may correspond to a user or entity and the second node corresponds to a user, entity, or geo-location. At step 220 one or more component metrics for computing a geo-metric are accessed. In particular embodiments, the geo-metric represents an assessment of a spatial commonality between the first node and the second node.

At Step 225, a spatial commonality may be determined based on whether a previous location of the first node was within a pre-determined distance of a previous location of the second node. In particular embodiments, the spatial commonalities are determined based on historical location data stored for the first node and historical location data stored for the second node. At step 230, one or more coefficients that each corresponding to one of the component metrics are accessed. At step 240, the geo-metric is calculated by applying the received coefficients to the component metrics and combining the component metrics. At step 250, the calculated geo-metric is provided. At step 255, a notification may be sent to a client system of the first node based at least in part on the calculated geo-metric having a value higher than a pre-determined threshold value. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates particular components carrying out particular steps of the method of FIG. 2, this disclosure contemplates any suitable combination of any suitable components carrying out any suitable steps of the method of FIG. 2.

Figure 3:
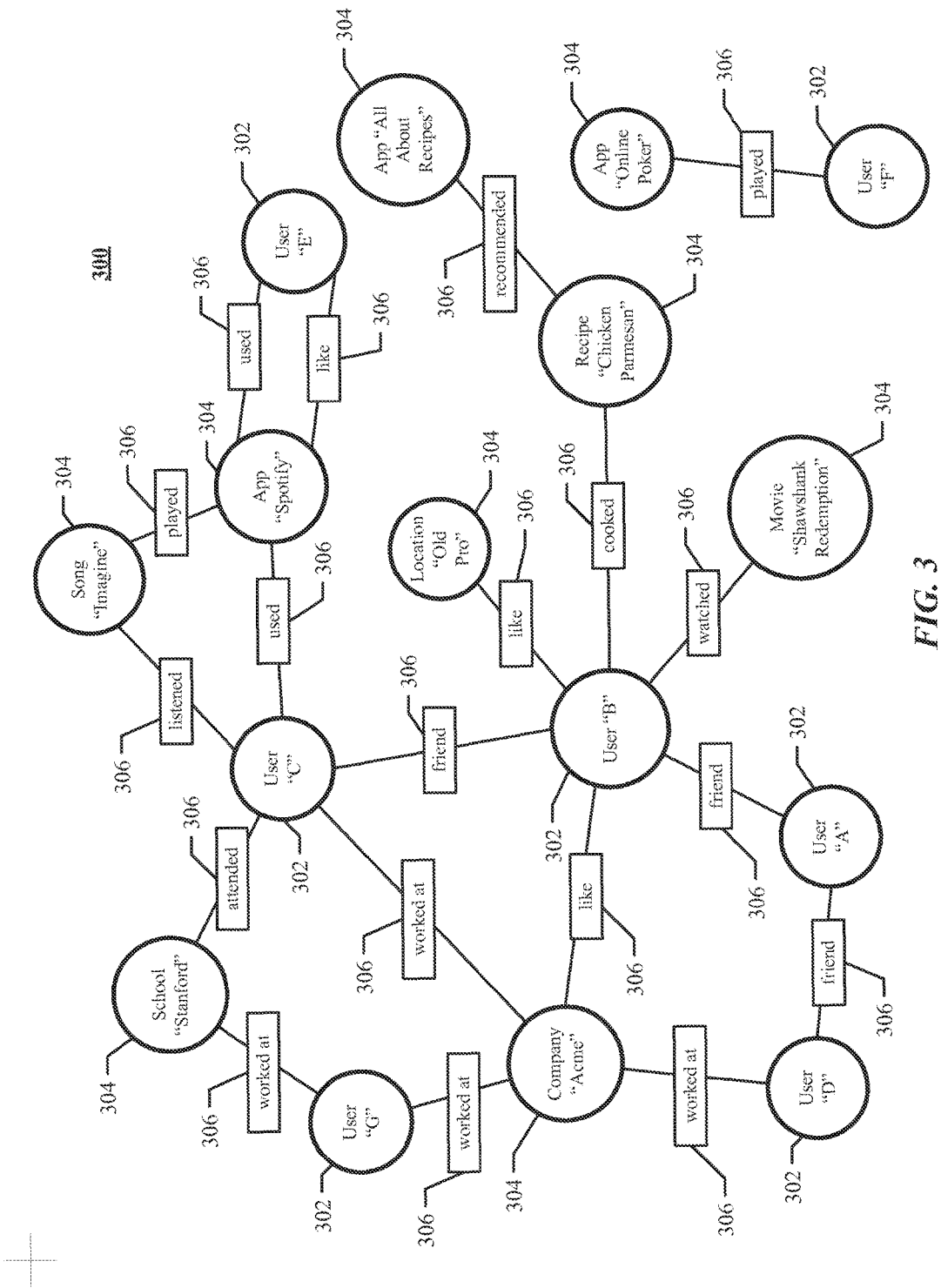
FIG. 3 illustrates an example social graph.

FIG. 3 illustrates an example social graph. In particular embodiments, social-networking system 160 may store one or more social graphs 300 in one or more data stores. In particular embodiments, social graph 300 may include multiple nodes—which may include multiple user nodes 302 or multiple concept nodes 304—and multiple edges 306 connecting the nodes. Example social graph 300 illustrated in FIG. 3 is shown, for didactic purposes, in a two-dimensional visual map representation. In particular embodiments, a social-networking system 160, client system 130, or third-party system 170 may access social graph 300 and related social-graph information for suitable applications. The nodes and edges of social graph 300 may be stored as data objects, for example, in a data store (such as a social-graph database). Such a data store may include one or more searchable or queryable indexes of nodes or edges of social graph 300.

In particular embodiments, a user node 302 may correspond to a user of social-networking system 160. As an example and not by way of limitation, a user may be an individual (human user), an entity (e.g. an enterprise, business, or third-party application), or a group (e.g. of individuals or entities) that interacts or communicates with or over social-networking system 160. In particular embodiments, when a user registers for an account with social-networking system 160, social-networking system 160 may create a user node 302 corresponding to the user, and store the user node 302 in one or more data stores. Users and user nodes 302 described herein may, where appropriate, refer to registered users and user nodes 302 associated with registered users. In addition or as an alternative, users and user nodes 302 described herein may, where appropriate, refer to users that have not registered with social-networking system 160. In particular embodiments, a user node 302 may be associated with information provided by a user or information gathered by various systems, including social-networking system 160. As an example and not by way of limitation, a user may provide his or her name, profile picture, contact information, birthdate, sex, marital status, family status, employment, education background, preferences, interests, or other demographic information. In particular embodiments, a user node 302 may be associated with one or more data objects corresponding to information associated with a user. In particular embodiments, a user node 302 may correspond to one or more webpages.

In particular embodiments, user node 302 may be associated with information inferred from the location data of the user. As an example and not by way of limitation, a home location of a user may be inferred from a geographic cluster associated with particular hours of the day, such as for example 2-5:00 AM, and the home location of the user may in turn be associated with user node 302.

In particular embodiments, a concept node 304 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 304 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 304 may be associated with one or more data objects corresponding to information associated with concept node 304. In particular embodiments, a concept node 304 may correspond to one or more webpages.

In particular embodiments, a node in social graph 300 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 304. Profile pages may be viewable by all or a selected subset of other users. As an example and not by way of limitation, a user node 302 may have a corresponding user-profile page in which the corresponding user may add content, make declarations, or otherwise express himself or herself. As another example and not by way of limitation, a concept node 304 may have a corresponding concept-profile page in which one or more users may add content, make declarations, or express themselves, particularly in relation to the concept corresponding to concept node 304.

In particular embodiments, a concept node 304 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to transmit to social-networking system 160 a message indicating the user's action. In response to the message, social-networking system 160 may create an edge (e.g., an "eat" edge) between a user node 302 corresponding to the user and a concept node 304 corresponding to the third-party webpage or resource and store edge 306 in one or more data stores.

In particular embodiments, a pair of nodes in social graph 300 may be connected to each other by one or more edges 306. An edge 306 connecting a pair of nodes may represent a relationship between the pair of nodes. In particular embodiments, an edge 306 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 306 connecting the first user's user node 302 to the second user's user node 302 in social graph 300 and store edge 306 as social-graph information in one or more data stores 24. In the example of FIG. 3, social graph 300 includes an edge 306 indicating a friend relation between user nodes 302 of user "A" and user "B" and an edge indicating a friend relation between user nodes 302 of user "C" and user "B." Although this disclosure describes or illustrates particular edges 306 with particular attributes connecting particular user nodes 302, this disclosure contemplates any suitable edges 306 with any suitable attributes connecting user nodes 302. As an example and not by way of limitation, an edge 306 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 300 by one or more edges 306.

In particular embodiments, an edge 306 between a user node 302 and a concept node 304 may represent a particular action or activity performed by a user associated with user node 302 toward a concept associated with a concept node 304. As an example and not by way of limitation, as illustrated in FIG. 3, a user may "like," "attended," "played," "listened," "cooked," "worked at," or "watched" a concept, each of which may correspond to a edge type or subtype. A concept-profile page corresponding to a concept node 304 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 306 and a "used" edge (as illustrated in FIG. 3) between user nodes 302 corresponding to the user and concept nodes 304 corresponding to the song and application to indicate that the user listened to the song and used the application. Moreover, social-networking system 160 may create a "played" edge 306 (as illustrated in FIG. 3) between concept nodes 304 corresponding to the song and the application to indicate that the particular song was played by the particular application. In this case, "played" edge 306 corresponds to an action performed by an external application (SPOTIFY) on an external audio file (the song "Imagine"). Although this disclosure describes particular edges 306 with particular attributes connecting user nodes 302 and concept nodes 304, this disclosure contemplates any suitable edges 306 with any suitable attributes connecting user nodes 302 and concept nodes 304. Moreover, although this disclosure describes edges between a user node 302 and a concept node 304 representing a single relationship, this disclosure contemplates edges between a user node 302 and a concept node 304 representing one or more relationships. As an example and not by way of limitation, an edge 306 may represent both that a user likes and has used at a particular concept. Alternatively, another edge 306 may represent each type of relationship (or multiples of a single relationship) between a user node 302 and a concept node 304 (as illustrated in FIG. 3 between user node 302 for user "E" and concept node 304 for "SPOTIFY").

In particular embodiments, social-networking system 160 may create an edge 306 between a user node 302 and a concept node 304 in social graph 300. As an example and not by way of limitation, a user viewing a concept-profile page (such as, for example, by using a web browser or a special-purpose application hosted by the user's client system 130) may indicate that he or she likes the concept represented by the concept node 304 by clicking or selecting a "Like" icon, which may cause the user's client system 130 to transmit to social-networking system 160 a message indicating the user's liking of the concept associated with the concept-profile page. In response to the message, social-networking system 160 may create an edge 306 between user node 302 associated with the user and concept node 304, as illustrated by "like" edge 306 between the user and concept node 304. In particular embodiments, social-networking system 160 may store an edge 306 in one or more data stores. In particular embodiments, an edge 306 may be automatically formed by social-networking system 160 in response to a particular user action. As an example and not by way of limitation, if a first user uploads a picture, watches a movie, or listens to a song, an edge 306 may be formed between user node 302 corresponding to the first user and concept nodes 304 corresponding to those concepts. Although this disclosure describes forming particular edges 306 in particular manners, this disclosure contemplates forming any suitable edges 306 in any suitable manner.

As another example, social-networking system 160 may create an edge 306 corresponding to a "like" relationship between user node 302 and concept node 304 corresponding to a particular type of music or particular sporting team based at least in part on the time-based routine of the user. Social-networking system 160 may create edge 306 corresponding to a "like" relationship between user node 302 and concept node 304 corresponding to a particular sports team in response to the user having a geographic cluster at a venue of the sporting team. As another example, social-networking system 160 may create an edge 306 corresponding to a "like" relationship between user node 302 and concept node 304 corresponding to a particular type of music in response to the user having a geographic cluster at a venue, such as for example a Jazz club, that specializes in a particular type of music.

In particular embodiments, social-networking system 160 may create implicit connections or edges 306 between a user node 302 and another user node 302 or concept node 304 in social graph 300 based on location data of the user or entity associated with user node 302. As an example and not by way of limitation, social-networking system 160 may create an edge 306 between two user nodes 302 based on the location data of the users indicating a spatial commonality. As another example, the social-networking system may create an edge 306 between a user node 302 and a concept node 304 that corresponds to a geo-location of a clothing store based on BLE beacon data indicating that the user has entered the clothing store. As another example, the social-networking system may create one or more edges 306 between user nodes 302 that correspond to a user and a particular group of musicians, and concept nodes 304 corresponding to a venue and a particular song based on location data and audio fingerprint data from the user.

A concept related to the geo-metric is that social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient. The affinity coefficient may represent or quantify the strength of a relationship between particular objects associated with the online social network. The affinity coefficient may also represent a probability or function that measures a predicted probability that a user will perform a particular action based on the user's interest in the action. In this way, a user's future actions may be predicted based on the user's prior actions, where the affinity coefficient may be calculated at least in part on the history of the user's actions. Affinity coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate an affinity coefficient. These factors may include, for example, user actions, types of relationships between objects, location information, other suitable factors, or any combination thereof. In particular embodiments, different factors may be weighted differently when calculating the affinity coefficient. The weights for each factor may be static or the weights may change according to, for example, the user, the type of relationship, the type of action, the user's location, and so forth. Ratings for the factors may be combined according to their weights to determine an overall affinity coefficient for the user. As an example and not by way of limitation, particular user actions may be assigned both a rating and a weight while a relationship associated with the particular user action is assigned a rating and a correlating weight (e.g., so the weights total 100%). To calculate the affinity coefficient of a user towards a particular object, the rating assigned to the user's actions may comprise, for example, 60% of the overall affinity coefficient, while the relationship between the user and the object may comprise 40% of the overall affinity coefficient. In particular embodiments, the social-networking system 160 may consider a variety of variables when determining weights for various factors used to calculate an affinity coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, an affinity coefficient may include a decay factor that causes the strength of the signal provided by particular actions to decay with time, such that more recent actions are more relevant when calculating the affinity coefficient. The ratings and weights may be continuously updated based on continued tracking of the actions upon which the affinity coefficient is based. Any type of process or algorithm may be employed for assigning, combining, averaging, and so forth the ratings for each factor and the weights assigned to the factors. In particular embodiments, social-networking system 160 may determine affinity coefficients using machine-learning algorithms trained on historical actions and past user responses, or data farmed from users by exposing them to various options and measuring responses. Although this disclosure describes calculating affinity coefficients in a particular manner, this disclosure contemplates calculating affinity coefficients in any suitable manner.

In particular embodiments, social-networking system 160 may calculate an affinity coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate an affinity coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high affinity coefficient with respect to the concept "coffee". Particular actions or types of actions may be assigned a higher weight and/or rating than other actions, which may affect the overall calculated affinity coefficient. As an example and not by way of limitation, if a first user emails a second user, the weight or the rating for the action may be higher than if the first user simply views the user-profile page for the second user.

In particular embodiments, social-networking system 160 may calculate an affinity coefficient based on the type of relationship between particular objects. Referencing the social graph 300, social-networking system 160 may analyze the number and/or type of edges 306 connecting particular user nodes 302 and concept nodes 304 when calculating an affinity coefficient. As an example and not by way of limitation, user nodes 302 that are connected by a spouse-type edge (representing that the two users are married) may be assigned a higher affinity coefficient than a user nodes 302 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the affinity coefficient for that object. As an example and not by way of limitation, if a user is tagged in first photo, but merely likes a second photo, social-networking system 160 may determine that the user has a higher affinity coefficient with respect to the first photo than the second photo because having a tagged-in-type relationship with content may be assigned a higher weight and/or rating than having a like-type relationship with content. In particular embodiments, social-networking system 160 may calculate an affinity coefficient for a first user based on the relationship one or more second users have with a particular object. In other words, the connections and affinity coefficients other users have with an object may affect the first user's affinity coefficient for the object. As an example and not by way of limitation, if a first user is connected to or has a high affinity coefficient for one or more second users, and those second users are connected to or have a high affinity coefficient for a particular object, social-networking system 160 may determine that the first user should also have a relatively high affinity coefficient for the particular object. In particular embodiments, the affinity coefficient may be based on the degree of separation between particular objects. The lower affinity coefficient may represent the decreasing likelihood that the first user will share an interest in content objects of the user that is indirectly connected to the first user in the social graph 300. As an example and not by way of limitation, social-graph entities that are closer in the social graph 300 (i.e., fewer degrees of separation) may have a higher affinity coefficient than entities that are further apart in the social graph 300.

In particular embodiments, social-networking system 160 may calculate an affinity coefficient based on location information. Objects that are geographically closer to each other may be considered to be more related or of more interest to each other than more distant objects. In particular embodiments, the affinity coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher affinity coefficient for the airport than the gas station based on the proximity of the airport to the user.

In particular embodiments, social-networking system 160 may perform particular actions with respect to a user based on affinity coefficient information. Affinity coefficients may be used to predict whether a user will perform a particular action based on the user's interest in the action. An affinity coefficient may be used when generating or presenting any type of objects to a user, such as advertisements, search results, news stories, media, messages, notifications, or other suitable objects. The affinity coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on affinity coefficient information. Content objects may be provided or selected based on affinity coefficients specific to a user. As an example and not by way of limitation, the affinity coefficient may be used to generate media for the user, where the user may be presented with media for which the user has a high overall affinity coefficient with respect to the media object. As another example and not by way of limitation, the affinity coefficient may be used to generate advertisements for the user, where the user may be presented with advertisements for which the user has a high overall affinity coefficient with respect to the advertised object. In particular embodiments, social-networking system 160 may generate search results based on affinity coefficient information. Search results for a particular user may be scored or ranked based on the affinity coefficient associated with the search results with respect to the querying user. As an example and not by way of limitation, search results corresponding to objects with higher affinity coefficients may be ranked higher on a search-results page than results corresponding to objects having lower affinity coefficients.

In particular embodiments, social-networking system 160 may calculate an affinity coefficient in response to a request for an affinity coefficient from a particular system or process. To predict the likely actions a user may take (or may be the subject of) in a given situation, any process may request a calculated affinity coefficient for a user. The request may also include a set of weights to use for various factors used to calculate the affinity coefficient. This request may come from a process running on the online social network, from a third-party system 170 (e.g., via an API or other communication channel), or from another suitable system. In response to the request, social-networking system 160 may calculate the affinity coefficient (or access the affinity coefficient information if it has previously been calculated and stored). In particular embodiments, social-networking system 160 may measure an affinity with respect to a particular process. Different processes (both internal and external to the online social network) may request an affinity coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 160. In addition or as an alternative, the social action may be promoted outside or off of social-networking system 160, where appropriate. In particular embodiments, a page may be an on-line presence (such as a webpage or website within or outside of social-networking system 160) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 160. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Application Publication No. 2012/0203831, entitled "Sponsored Stories Unit Creation from Organic Activity Stream" and filed 3 Feb. 2012 as U.S. patent application Ser. No. 13/020,745, or U.S. Patent Application Publication No. 2012/0233009, entitled "Endorsement Subscriptions for Sponsored Stories" and filed 9 Mar. 2011 as U.S. patent application Ser. No. 13/044, 506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g., through social-networking system 160) or RSVP (e.g., through social-networking system 160) to an event associated with the advertisement. In addition or as an alternative, an advertisement may include social-networking-system content directed to the user. For example, an advertisement may display information about a friend of the user within social-networking system 160 who has taken an action associated with the subject matter of the advertisement.

Social-networking-system functionality or content may be associated with an advertisement in any suitable manner. For example, an advertising system (which may include hardware, software, or both for receiving bids for advertisements and selecting advertisements in response) may retrieve social-networking functionality or content from social-networking system 160 and incorporate the retrieved social-networking functionality or content into the advertisement before serving the advertisement to a user. Examples of selecting and providing social-networking-system functionality or content with an advertisement are disclosed in U.S. Patent Application Publication No. 2012/0084160, entitled "Providing Social Endorsements with Online Advertising" and filed 5 Oct. 2010 as U.S. patent application Ser. No. 12/898,662, and in U.S. Patent Application Publication No. 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or content may cause information about the interaction to be displayed in a profile page of the user in social-networking-system 160.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 160 to identify those users. In addition or as an alternative, social-networking system 160 may use user-profile information in social-networking system 160 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 160, off or outside of social-networking system 160, or on mobile computing devices of users. When on or within social-networking system 160, such targeting may be directed to users' news feeds, search results, e-mail or other in-boxes, or notifications channels or may appear in particular area of web pages of social-networking system 160, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 160, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 160 or explicit connections of a user to a node, object, entity, brand, or page on social-networking system 160. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; geo-metrics; coefficients; affinities; or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. 2009/0070219, entitled "Targeting Advertisements in a Social Network" and filed 20 Aug. 2008 as U.S. patent application Ser. No. 12/195,321; U.S. Patent Application Publication No. 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. 2012/0159635, entitled "Comment Plug-In for Third-Party System" and filed 15 Dec. 2010 as U.S. patent application Ser. No. 12/969,368; U.S. Patent Application Publication No. 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Pat. No. 8,402,094, entitled "Providing a Newsfeed Based on User Affinity for Entities and Monitored Actions in a Social Network Environment" and filed 11 Aug. 2006 as U.S. patent application Ser. No. 11/503,093; U.S. Patent Application Publication No. 2012/0072428, entitled "Action Clustering for News Feeds" and filed 16 Sep. 2010 as U.S. patent application Ser. No. 12/884,010; U.S. Patent Application Publication No. 2011/0004692, entitled "Gathering Information about Connections in a Social Networking Service" and filed 1 Jul. 2009 as U.S. patent application Ser. No. 12/496,606; U.S. Patent Application Publication No. 2008/0065701, entitled "Method and System for Tracking Changes to User Content in an Online Social Network" and filed 12 Sep. 2006 as U.S. patent application Ser. No. 11/531,154; U.S. Patent Application Publication No. 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

In particular embodiments, analytics executed on servers of the social-networking system may use the geo-metric track the impact of feature has at an individual feature level or at a product level. As an example and not by way of limitation, a particular business entity may send advertisements to users as one or more notifications. In particular embodiments, the notifications may be sent in response to the calculated geo-metric having a value higher than a pre-determined threshold value. Furthermore, detecting an increase in the value of the geo-metric between a particular user to the business, which implies a higher amount of spatial commonality, may lead to the social-networking system increasing the number of notifications sent to the user. On the other hand, if increasing notification throughput makes no difference or leads to a decrease in the value of the geo-metric, the social-networking system may reduce the number of notifications that are sent to the user. As another example, advertisers might want to show more ads of products that are inherently social like board games to a user with a high user to user geo-metric (implying a high amount of spatial commonality with other users), while surfacing more advertising for gaming mobile apps to users with a low user to user geo-metric (implying a low amount of spatial commonality with other users).

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 304 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 4:
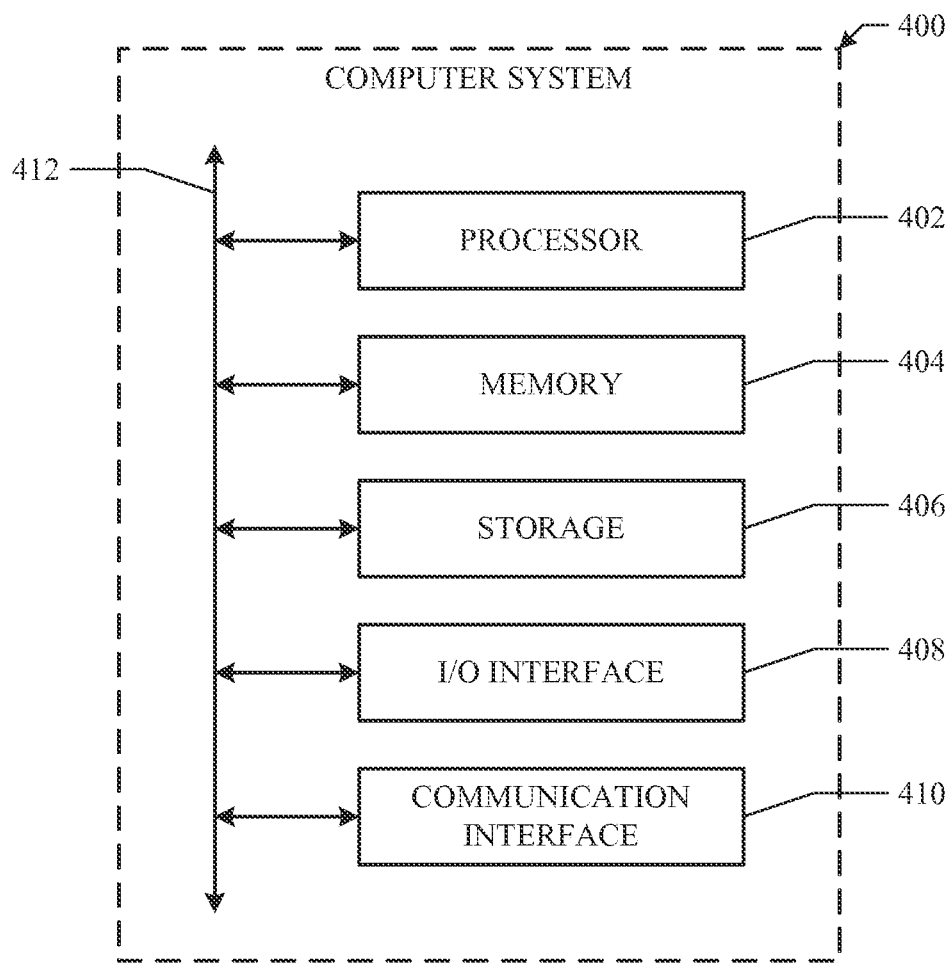
FIG. 4 illustrates an example computing system.

FIG. 4 illustrates example computing system. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computing device, identifying a first node and a second node in a social graph, wherein historical location data is available for the first node and for the second node;
   by the computing device, accessing one or more component metrics for computing a geo-metric, wherein the geo-metric represents an assessment of a spatial commonality between the first node and the second node, wherein the spatial commonalities are determined based on historical location data stored for the first node and historical location data stored for the second node;
   by the computing device, accessing one or more coefficients each corresponding to one of the component metrics;
   by the computing device, calculating the geo-metric by applying the received coefficients to the component metrics and combining the component metrics;
   by the computing device, providing the calculated geo-metric; and
   by the computing device, sending a notification to a client device of the first node based at least in part on a value of the calculated geo-metric relative to a pre-determined threshold value, wherein the notification comprises a content object of the second node.

2. The method of claim 1, the social graph comprises a plurality of nodes and a plurality of edges connecting the nodes;
   the first node corresponds to a user or entity; and the second node corresponds to a user, entity, or geo-location.

3. The method of claim 2, wherein the historical location data comprises implicit location data that is obtained without manual input from the user.

4. The method of claim 3, wherein the implicit location data comprises global positioning system data, WI-FI location data, cellular-tower location data, BLUETOOTH beacon data, or audio fingerprint data.

5. The method of claim 2, wherein the historical location data comprises explicit location data that is obtained based on input from the user on a social-networking system.

6. The method of claim 5, wherein the explicit location data comprises a check-in or profile information.

7. The method of claim 1, wherein determining the spatial commonalities comprises determining whether a previous location of the first node was within a pre-determined distance of a previous location of the second node based on the stored historical location data of the first and second nodes.

8. The method of claim 7, wherein the stored historical location data comprises location data having a temporal overlap between the first and second nodes.

9. The method of claim 1, wherein the component metrics comprise a recency-based component metric, time-duration component metric, or time-independent component metric.

10. The method of claim 9, wherein calculating the time-independent component metric comprises:
determining one or more geographic clusters of the first and second nodes based on the historical location data; and
determining whether any of the determined geographic clusters are shared between the first and second nodes.

11. The method of claim 1, wherein one or more of the coefficients are based on an affinity between the first and second nodes.

12. The method of claim 1, wherein calculating the geo-metric comprises calculating a sum of the combined component metrics.

13. The method of claim 1, wherein the calculated geo-metric has a value in a range between 0 and 1.

14. The method of claim 1, further comprising updating a value of one or more of the component metrics based on updated location data of the first node.

15. The method of claim 1, wherein sending the notification to the client device is further based on the value of the calculated geo-metric being higher than the pre-determined threshold value.

16. The method of claim 15, further comprising increasing a rate of notifications sent to the client device in response to detecting an increase in the value of the calculated geo-metric.

17. The method of claim 15, further comprising decreasing a rate of notifications sent to the client device in response to detecting a decrease in the value of the calculated geo-metric.

18. The method of claim 1, wherein determining the spatial commonalities comprises determining whether the first node has previously been within an area associated with the second node based on the stored historical location data of the first and second nodes.

19. One or more computer-readable non-transitory storage media embodying software configured when executed to:
identify a first node and a second node in a social graph, wherein historical location data is available for the first node and for the second node;
access one or more component metrics for computing a geo-metric, wherein the geo-metric represents an assessment of a spatial commonality between the first node and the second node, wherein the spatial commonalities are determined based on historical location data stored for the first node and historical location data stored for the second node;
access one or more coefficients each corresponding to one of the component metrics;
calculate the geo-metric by applying the received coefficients to the component metrics and combining the component metrics;
provide the calculated geo-metric; and
send a notification to a client device of the first node based at least in part on a value of the calculated geo-metric relative to a pre-determined threshold value, wherein the notification comprises a content object of the second node.

20. The media of claim 19, wherein the social graph comprises a plurality of nodes and a plurality of edges connecting the nodes;
the first node corresponds to a user or entity; and
the second node corresponds to a user, entity, or geo-location.

21. The media of claim 20, wherein the historical location data comprises implicit location data that is obtained without manual input from the user.

22. The media of claim 21, wherein the implicit location data comprises global positioning system data, WI-FI location data, cellular-tower location data, BLUETOOTH beacon data, or audio fingerprint data.

23. The media of claim 20, wherein the historical location data comprises explicit location data that is obtained based on input from the user on a social-networking system.

24. The media of claim 23, wherein the explicit location data comprises a check-in or profile information.

25. The media of claim 19, wherein the software is further configured to determine whether a previous location of the first node was within a pre-determined distance of a previous location of the second node based on the stored historical location data of the first and second nodes.

26. The media of claim 25, wherein the stored historical location data comprises location data having a temporal overlap between the first and second nodes.

27. The media of claim 19, wherein the component metrics comprise a recency-based component metric, time-duration component metric, or time-independent component metric.

28. The media of claim 27, wherein the software is further configured to: determine one or more geographic clusters of the first and second nodes based on the historical location data; and determine whether any of the determined geographic clusters are shared between the first and second nodes.

29. The media of claim 19, wherein one or more of the coefficients are based on an affinity between the first and second nodes.

30. The media of claim 19, wherein the software is further configured to calculate a sum of the combined component metrics.

31. The media of claim 19, wherein the calculated geo-metric has a value in a range between 0 and 1.

32. The media of claim 19, wherein the software is further configured to update a value of one or more of the component metrics based on updated location data of the first node.

33. The media of claim 19, wherein sending the notification to the client device is further based on the value of the calculated geo-metric being higher than the pre-determined threshold value.

34. The media of claim 33, wherein the software is further configured to increase a rate of notifications sent to the client device in response to detecting an increase in the value of the calculated geo-metric.

35. The media of claim 33, wherein the software is further configured to decrease a rate of notifications sent to the client device in response to detecting a decrease in the value of the calculated geo-metric.

36. The media of claim 19, wherein the software is further configured to determine whether the first node has previously been within an area associated with the second node based on the stored historical location data of the first and second nodes.

37. A device comprising:
one or more processors; and
one or more computer-readable non-transitory storage media coupled to the processors and embodying software configured when executed to:
identify a first node and a second node in a social graph, wherein historical location data is available for the first node and for the second node;
access one or more component metrics for computing a geo-metric, wherein the geo-metric represents an assessment of a spatial commonality between the first node and the second node, wherein the spatial commonalities are determined based on historical location data stored for the first node and historical location data stored for the second node;
access one or more coefficients each corresponding to one of the component metrics;
calculate the geo-metric by applying the received coefficients to the component metrics and combining the component metrics;
provide the calculated geo-metrics; and
send a notification to a client device of the first node based at least in part on a value of the calculated geo-metric relative to a pre-determined threshold value, wherein the notification comprises a content object of the second node.

38. The device of claim 37, wherein the social graph comprises a plurality of nodes and a plurality of edges connecting the nodes;
the first node corresponds to a user or entity; and
the second node corresponds to a user, entity, or geo-location.

39. The device of claim 38, wherein the historical location data comprises implicit location data that is obtained without manual input from the user.

40. The device of claim 39, wherein the implicit location data comprises global positioning system data, WI-FI location data, cellular-tower location data, BLUETOOTH beacon data, or audio fingerprint data.

41. The device of claim 38, wherein the historical location data comprises explicit location data that is obtained based on input from the user on a social-networking system.

42. The device of claim 41, wherein the explicit location data comprises a check-in or profile information.

43. The device of claim 37, wherein the software is further configured to determine whether a previous location of the first node was within a pre-determined distance of a previous location of the second node based on the stored historical location data of the first and second nodes.

44. The device of claim 43, wherein the stored historical location data comprises location data having a temporal overlap between the first and second nodes.

45. The device of claim 37, wherein the component metrics comprise a recency-based component metric, time-duration component metric, or time-independent component metric.

46. The device of claim 45, wherein the software is further configured to:
determine one or more geographic clusters of the first and second nodes based on the historical location data; and
determine whether any of the determined geographic clusters are shared between the first and second nodes.

47. The device of claim 37, wherein one or more of the coefficients are based on an affinity between the first and second nodes.

48. The device of claim 37, wherein the software is further configured to calculate a sum of the combined component metrics.

49. The device of claim 37, wherein the calculated geo-metric has a value in a range between 0 and 1.

50. The device of claim 37, wherein the software is further configured to update a value of one or more of the component metrics based on updated location data of the first node.

51. The device of claim 37, wherein sending the notification to the client device is further based on the value of the calculated geo-metric being higher than the pre-determined threshold value.

52. The device of claim 51, wherein the software is further configured to increase a rate of notifications sent to the client device in response to detecting an increase in the value of the calculated geo-metric.

53. The device of claim 51, wherein the software is further configured to decrease a rate of notifications sent to the client device in response to detecting a decrease in the value of the calculated geo-metric.

54. The device of claim 37, wherein the software is further configured to determine whether the first node has previously been within an area associated with the second node based on the stored historical location data of the first and second nodes.

* * * * *